Dec. 13, 1949  J. A. JOHNSON  2,490,873
FLUID LENS CONSTRUCTION
Filed April 6, 1946

INVENTOR.
John A. Johnson
BY
Davis, Lindsey, Smith & Shonts
Attorneys

Patented Dec. 13, 1949

2,490,873

UNITED STATES PATENT OFFICE 2,490,873

FLUID LENS CONSTRUCTION

John A. Johnson, Chicago, Ill.

Application April 6, 1946, Serial No. 660,057

1 Claim. (Cl. 88—57)

The invention relates generally to lens constructions and more particularly to a fluid-filled lens.

Lenses have heretofore been constructed by taking two sheets or discs of glass of substantially uniform thickness, bending or moulding them to provide the desired curvature, placing them together in face-to-face relation so that the curvature thereof provides a space therebetween, and filling the space with a clear liquid such as water. It is obvious that a lens of such construction may be much less expensive to manufacture than a lens comprising a single piece of glass with its opposite faces ground to opposite curvatures. However, in prior constructions, the manner in which the two discs have been held together, and the manner of placing the liquid, and retaining it, in the space between the two discs have not been entirely satisfactory. Such difficulty has arisen chiefly, I believe, because of the fact that mechanical means, such as a metal frame, has been relied upon to hold the two discs together. Moreover, such means represents a substantial part of the cost of a lens of this character, and the assembly thereof with the glass discs and the insertion of the liquid therebetween have materially added to the cost.

The general object of the invention is, therefore, to provide a novel lens construction comprising a pair of glass discs shaped to provide the desired curvature of the exterior surfaces of the lens with a liquid-filled space therebetween, the two discs so cooperating with each other that no securing means is required to hold them together.

More specifically, it is an object of the invention to provide a lens of the foregoing character, in which the two discs so engage each other that even a slight separation of the discs creates a vacuum within the discs and atmospheric pressure thereby holds them against such separation.

A further object is to provide a lens of the foregoing character, having the two discs held together by atmospheric pressure and provided with sealing material around its periphery to insure against air entering the space between the discs.

Another object is to provide a lens of the foregoing character, adapted to be supported in a metal frame or the like, but which does not rely on such frame to hold the discs together.

Still another object is to provide a lens of the foregoing character, having a sealing material as above stated, such material being plastic in character and extending over the periphery of the discs and thereby serving as a cushion between the discs and a frame for supporting the lens.

Other objects and advantages will become apparent from the following description taken in connection with the accompanying drawing, in which.

Figure 1:
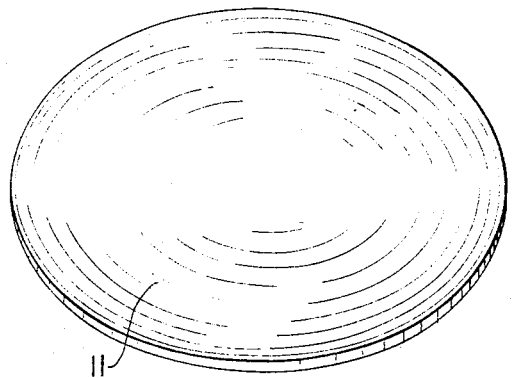
Figure 1 is a perspective view of a lens embodying the features of the invention.
Figure 2:
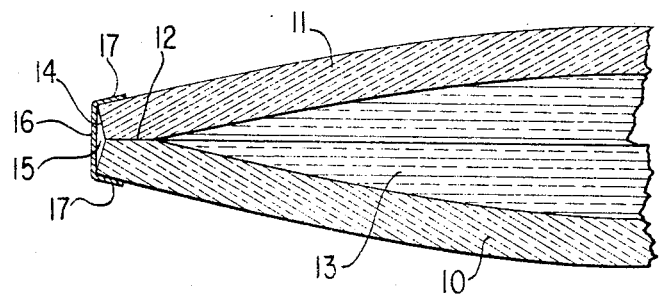
Fig. 2 is an enlarged fragmentary sectional view of the lens shown in Fig. 1.

As heretofore mentioned, a lens of the general character disclosed herein comprises a pair of glass discs, dished or spherically formed and placed together, the curvature of the discs being such as to form an enclosed space which is filled with a clear liquid such as water. The chief advantage of this type of construction lies in the fact that the costly job of grinding the opposite surfaces of a single piece of glass is avoided. With a lens of this character, each disc may comprise a sheet of glass of uniform thickness throughout its area and moulded or bent to provide the spherical form. The liquid, which may be water, is one which has an index of refraction substantially the same as or close to that of glass. The glass discs plus the water content, therefore, will effect a refraction of light in substantially the same manner as a lens made of a solid piece of glass.

The present invention relates to structure whereby the two discs of glass may be held together to retain the liquid therebetween. Heretofore, metallic frames have served this function but they have not proved entirely satisfactory, for the reasons heretofore stated. In the lens construction shown herein, the two discs are so constructed as to cooperate with each other in a manner which eliminates the necessity of any securing means to hold the discs in the proper relation to one another. To this end, I construct the discs so that they interfit in an airtight manner so that any tendency to effect even a slight separation of the discs tends to create a vacuum in the space therebetween, and atmospheric pressure, therefore, holds them together. The discs, for this purpose, are provided with inter-engaging surfaces at their periphery which prevent, so long as they are in tight engagement, any air from entering the space between the discs. Thus, any separation would increase the volume of the interior space and a vacuum would thereby be formed. Atmospheric pressure, therefore, holds the discs together, the liquid within the discs of course rendering the seal between the inter-engaging surfaces of the discs more effective. To further insure a tight seal, a cement or similar material, preferably plastic in character, is placed on the periphery of the discs.

As shown in the drawings, the preferred embodiment of the invention comprises a pair of glass discs 10 and 11. These discs may be made of ordinary sheet glass of good quality and are of substantially uniform thickness throughout their area. The discs are then moulded or shaped to provide the desired curvature of the two outer surfaces of the finished lens. In the present instance, I have shown a lens the outer surfaces of which are both convex and of the same curvature. Lenses having their outer surfaces of different convexity and lenses having one surface convex and the other surface concave but of different curvature, of course, fall within the scope of the invention.

The two discs are constructed at their periphery to engage with one another in such a manner as to provide an airtight bearing therebetween. To this end, the inner corner of each disc shown, formed by meeting of the peripheral edge with the concave surface of the disc, is ground to provide a flat angular surface 12 adapted to engage in coplanar relation with the corresponding surface on the other disc. Such grinding may be readily and inexpensively performed since only a small amount of glass is removed and the finished ground surface lies in a single plane.

The two discs when so ground are then ready for placement in assembled relation with one another and for being filled with liquid. The space between the discs may be easily filled with liquid, indicated at 13, merely by placing the discs under water and moving them together while submerged. In this manner, the space between the discs 10 and 11 will be completely filled with water. As soon as they are removed from the water, they will be firmly held together by atmospheric pressure, since the water within the discs cooperating with the ground surfaces 12 will tend to prevent access of air to the interior space when any force is exerted tending to separate the two discs. Thus, the two discs are held together by their inherent construction rather than by reliance upon external means to exert the holding force.

To further insure the prevention of any air entering between the discs, a cement, preferably of plastic character, may be placed around the periphery of the discs to provide an assisting seal cooperating with the sealing effect of the ground surfaces 12 to prevent the entrance of air. Since each disc is made from a sheet of glass having its peripheral edge cut at substantially a right angle to the surface at the periphery, the peripheral edges of the two discs, when moulded into sperical form and placed together, provide a shallow groove 14 into which such plastic cement may be readily placed and retained, as indicated at 15. In commercial production of lenses of the character herein shown, I prefer to use a neoprene cement, since this readily adheres to glass and has the desired plastic character.

Lenses of the present construction may have a wide variety of uses, but in practically all such uses a supporting frame is employed. This supporting frame, however, with a lens of the present construction, does not function to hold the discs 10 and 11 together, but merely serves as a support for the assembled lens. In the present instance, I have shown a lens of the character utilized in a magnifying glass such as may be used for reading fine type. In this instance, I have not illustrated the frame structure since it forms no part of the invention. However, such frame is usually constructed of metal and, to support the lens without danger of chipping the edge thereof, I prefer to place a thin layer of cushioning material over the peripheral portion of the lens. In the present instance, I provide such cushioning material by covering the cement 15 with a coating 16 of pure neoprene. The coating 16, preferably, is carried a short distance over the margin of the two faces of the lens, as indicated at 17.

From the foregoing, it will be apparent that I have provided a lens which may be inexpensively constructed, since it is made from two discs of glass of uniform thickness, and the two discs will be firmly held together by atmospheric pressure. Thus, no reliance need be placed upon a frame structure to effect such holding so that the lens may be handled readily in assembling it with a supporting frame without danger of misaligning or separating the two discs.

I claim:

A lens comprising a pair of spherically curved spaced walls, a clear liquid filling the space between said walls, the opposing faces of said walls being provided with flat annular peripheral portions bearing against each other and held in airtight engagement substantially entirely by atmospheric pressure and the peripheral edges of said walls being substantially perpendicular to the outer surfaces of said walls thereby forming a V-shaped peripheral groove at the juncture between said walls, and a sealing material disposed in said groove to prevent entry of air between said walls.

JOHN A. JOHNSON.

REFERENCES CITED

The following references are of record in the file of this patent:

UNITED STATES PATENTS

| Number | Name | Date |
|---|---|---|
| 509,379 | Ingram | Nov. 28, 1893 |
| 1,269,422 | Gordon | June 11, 1918 |
| 1,929,228 | Wilhelm | Oct. 3, 1933 |
| 2,033,101 | Tillyer et al. | Mar. 3, 1936 |
| 2,129,305 | Feinbloom | Sept. 6, 1938 |

FOREIGN PATENTS

| Number | Country | Date |
|---|---|---|
| 9,432 | Great Britain | Apr. 22, 1913 |
| 101,260 | Great Britain | Aug. 31, 1916 |
| 734,657 | France | Aug. 2, 1932 |